(12) United States Patent
Sugiyama et al.

(10) Patent No.: US 6,337,736 B1
(45) Date of Patent: Jan. 8, 2002

(54) THERMAL DEFORMATION COMPENSATING RANGE FINDER

(75) Inventors: Osamu Sugiyama; Akio Izumi; Nobuo Hirata; Hajime Fukamura, all of Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/597,084

(22) Filed: Jun. 20, 2000

(30) Foreign Application Priority Data

Jul. 23, 1999 (JP) .......................... 11-209510
Aug. 30, 1999 (JP) .......................... 11-242574

(51) Int. Cl.[7] .................. G01C 3/08; G03B 13/00; G03B 3/00
(52) U.S. Cl. ........................ 356/3.14; 396/97
(58) Field of Search ................ 356/3.14; 396/97

(56) References Cited

U.S. PATENT DOCUMENTS 6,046,795 A * 4/2000 Sugiyama et al. ......... 356/3.14

* cited by examiner

Primary Examiner—Thomas H. Tarcza
Assistant Examiner—Fred H. Mull
(74) Attorney, Agent, or Firm—Kanesaka & Takeuchi

(57) ABSTRACT

The range finder measures the distance to the object based on the principle of triangulation, and includes a pair of lenses; a lens supporting frame; a CCD supporting plate; CCD packages supported by the plate; and temperature sensors. One sensor is positioned on the frame between the lenses, and the other is positioned on the plate between the CCD packages. Each CCD package includes a CCD chip located at a focal plane of the lens, a casing and a transparent plate. The lenses, frame, casing and transparent plates are made of the same plastic material so that the thermal expansion of the entire range finder caused by the temperature change may not affect to the distance measurement. Bonding ribs connected to the transparent plate are located near an image ray hole to face each other and on the line perpendicular to the optical axis of the CCD chip and the plane containing the optical axes of the CCD chips. Therefore, the thermal deformation of the transparent plate in the base line direction of the range finder may not affect significantly. The range finder of the invention can reduce the distance measurement error caused by nonuniform thermal deformations of the parts.

8 Claims, 8 Drawing Sheets

THERMAL DEFORMATION COMPENSATING RANGE FINDER

BACKGROUND OF THE INVENTION AND RELATED ART STATEMENT

The present invention relates to a range finder or distance measuring apparatus, which is used in, for example, an apparatus for detecting the distance to a vehicle running in front. More specifically, the present invention relates to a range finder that improves an measurement error due to unequal thermal deformation distribution of the plastic material forming the finder by a characteristic of low thermal conductivity of the plastic material based on heat generated by the current flowing through a CCD sensor chip.

In the following, the same reference numerals and symbols in the drawings are used for designating the same or corresponding constituent elements.

A range finder or distance measuring apparatus, which measures a distance to an object by electrically comparing the images focused by two adjacent optical systems based on the principle of triangulation, has been used widely. At first, the principle of triangulation will be explained below.

FIG. 3 is a schematic drawing for explaining the principle of triangulation. Referring now to FIG. 3, object images 23, 24 are formed on optical sensor arrays 25, 26 by focusing lens 1a, 1b. Since triangles 27 and 28 are similar to triangles 27' and 28' respectively, the distance L to an object is expressed by the following formula (1).

$$L = Bf/(x1+x2) = Bf/x \qquad (1)$$

Here, B is a distance between optical axes of the focusing lenses 1a and b (hereinafter referred to as a "base line length") and f is a focal length. Since B and f are constants, the distance L to the object is determined by detecting the shift length x of the object images.

FIG. 4 shows a cross section of a conventional range finder constructed on the basis of the principle described with reference to FIG. 3. Referring now to FIG. 4, the conventional range finder includes lenses 1a and 1b spaced apart from each other for a base line length B, lens supporting means 2 for supporting the lenses 1a and 1b, CCD packages 3a and 3b, and CCD supporting means 4 for supporting the CCD packages 3a and 3b. The CCD packages 3a and 3b include CCD chips 25' and 26', respectively. The CCD packages 3a and 3b are arranged such that the optical sensor arrays on the respective CCD chips 25' and 26' are spaced apart from each other for the base line length in the focal plane of the lenses 1a and 1b.

Each of the CCD packages 3a and 3b includes a plastic casing 6 and a transparent plastic plate 8 fixed to the plastic casing 6. The CCD chips 25' and 26' are bonded to the respective plastic casings 6 with a thermosetting adhesive AH.

FIGS. 5(a) and 5(b) show bonding portions between the CCD supporting means 4 and the CCD packages 3a, 3b shown in FIG. 4. FIG. 5(a) is a vertical cross sectional view of the bonding portions between the CCD supporting means 4 and the CCD packages 3a, 3b. FIG. 5(b) is a cross sectional view taken along line 5b—5b in FIG. 5(a).

Referring now to FIG. 5(b), bonding ribs 5A, each shaped with a rectangular ring and protruding around an image ray hole HL through which an image ray from the lens 1a or 1b passes, are formed on the bottom surface of the CCD supporting means 4. The CCD packages 3a and 3b are fixed to the CCD supporting means 4 such that the transparent plastictes 8 for the CCD packages 3a and 3b are bonded to bonding planes 5, which are lower end faces of the bonding ribs 5A.

A plastic, such as cycloolefin polymer, which exhibits a low water absorbing capacity and excellent optical characteristics is used for the lenses 1a and 1b, lens supporting means 2, CCD supporting means 4, plastic casings 6 and transparent plates 8.

Thus, by making all the constituent elements except for the CCD chips 25' and 26' by the same material, any relative positional shift does not occur between the lenses nor between the CCDs, since all the constituent elements except for the CCD chips 25' and 26' expand or contract thermally at the same rate in response to the environmental temperature changes.

FIG. 8(a) is a cross sectional view of an entire range finder structure (hereinafter referred to as a "range finder module" for the sake of convenience) at a certain temperature corresponding to the range finder designated in FIG. 3 for explaining the principle of triangulation. FIG. 8(b) is another cross sectional view of the range finder module thermally expanded due to an environmental temperature rise while maintaining the relative positional relations of the constituent elements in the range finder module including the lenses 1a, 1b and the CCD chips 25', 26'.

In FIG. 8(a), the distance L to the object is expressed by the foregoing formula (1) based on the principle of triangulation. When the range finder module has thermally expanded as shown in FIG. 8(b), the product $(B+\Delta B) \times (f+\Delta f)$ of the base line length $(B+\Delta B)$ and the focal length $(f+\Delta f)$ after the thermal expansion is proportional to the shift length $(x1'+x2')=(x+\Delta x)$ after the thermal expansion. Therefore, the distance L to the object detected after the thermal expansion is the same as the distance L detected before the thermal expansion.

Since the range finder module is made of the same material, all the constituent elements thermally expand uniformly in all the directions and the similarity relations between the foregoing triangles are maintained.

As far as the range finder module is made of the same material and the temperature is uniform throughout the module in the conduction state of the CCD chips in the same manner as in the environmental temperature rise, no problem occurs on the accuracy of the distance measurement.

However, even if the entire range finder module is made of the plastic material, the CCD chips 25' and 26', which are semiconductor optical sensors, generate heat when a current is supplied to the CCD chips 25' and 26', and the generated heat causes thermal expansions of the CCD packages 3a, 3b sealing the CCD chips therein and the CCD supporting means 4, to which the CCD packages are fixed.

Moreover, due to the low thermal conductivity, which is a characteristic of the plastic material, the influences of the CCD supporting means 4 and the lens supporting means 2 to the thermal expansion are different and an error occurs in the measured distance by nonuniform thermal conductivity.

As described with reference to FIGS. 4 and 5, the CCD packages 3a and 3b are connected to the CCD supporting means 4 such that the transparent plates 8 are fixed to the respective lower end faces (bonding planes 5) of the bonding ribs 5A formed on the bottom surface of the CCD supporting means 4.

Due to this configuration, when the CCD chips generate heat, thermal conduction occurs from the heat sources, i.e. CCD chips, to the lens supporting means 2 via the plastic casing 6, the transparent plates 8 and the CCD supporting means 4 in order. Therefore, even if all the constituent elements have the same temperature when a current starts to flow through the CCD chips, the CCD supporting means 4 will start expanding earlier and the lens supporting means 2 will start expanding at a certain period later.

Even when the temperatures of all the constituent elements become sufficiently stable, a certain temperature difference occurs between the CCD supporting means 4 and the lens supporting means 2. Due to the temperature difference, the optical axes connecting the CCD supporting means 4 and the lens supporting means 2 after the current conduction shift with respect the corresponding optical axes before the current conduction, in such a direction that the base line length on the side of the CCD supporting means 4 is longer than the base line length on the side of the lens supporting means 2 after the current conduction. This non-parallel shift of the optical axes causes a measurement error.

FIG. 6 is a graph relating to the shift length of the optical axes with the elapse of time (lateral axis) soon after the current conduction through the CCD chips. Assuming that the vertical axis of FIG. 6 represents the shift length x described with reference to FIG. 3, FIG. 6 indicates that the shift length x tends to decrease with the elapse of time. This change of the shift length occurs by the change in the positional relation between the optical axes due to the thermal expansion difference between the CCD supporting means 4 and the lens supporting means 2 caused soon after the current conduction.

The shift length reaches a steady state after 10 to 15 minute simply because the temperatures of the CCD supporting means 4 and the lens supporting means 2 become stable and their thermal expansions cease.

When the distance is measured by using the shift length after the temperatures of all the constituent elements become stable, a certain measurement error will occur for several minutes after the power supply to the range finder module by the heat generation in the CCD chips even if all the constituent elements of the range finder module are made of the same plastic material.

On the other hand, the thermal expansion coefficient of the CCD chips 25' and 26' made of silicon is different from the thermal expansion coefficient of the plastic. The temperature of the CCD chips 25' and 26' is higher for about 10° C. than the environmental temperature due to the heat generated therein by the current conduction. The heat generation in the CCD chips 25', 26' causes complicated thermal deformations to the CCD packages 3a, 3b and the supporting means 4, to which the CCD packages 3a, 3b are fixed. The thermal deformations further cause an error in the distance measurement, which is a second problem.

In the conventional range finder described with reference to FIGS. 4 and 5, the CCD supporting means 4 and the CCD packages 3a, 3b are bonded tightly by bonding the lower end faces (bonding planes) 5 of the respective bonding ribs 5A, which are formed on the bottom surface of the CCD supporting means 4 to protrude around the image ray holes HL through which the image rays pass, to the respective transparent plates 8 fixed to the plastic casings 6 of the CCD packages 3a, 3b. The entire peripheral portions of the transparent plates 8 are fixed to the CCD supporting means 4.

FIG. 10 is a top plasticn view of the CCD supporting means 4 schematically showing the thermal deformation thereof in the conventional range finder. FIG. 9 is a top plan view of the CCD supporting means 4 schematically showing the ideal thermal deformation thereof. As shown in FIG. 9, it is desirable for the CCD supporting means 4 to expand uniformly in the longitudinal direction thereof, i.e. in the base line direction.

Since the entire peripheral portions of the transparent plates 8 are fixed to the CCD supporting means 4 in the conventional range finder, the heat generated in the CCD chips 25', 26' dissipates from the peripheral portions of the transparent plates 8 to the CCD supporting means 4. The transparent plates 8 on the high-temperature side due to the heat dissipation expand in all the directions as shown in FIG. 10. The expanding transparent plates 8 widen the image ray holes HL of the CCD supporting means 4 and further cause complicated two-dimensional thermal deformation of the CCD supporting means 4.

Due to the complicated deformation of the CCD supporting means 4, the elongation of the base line in the CCD supporting means 4 and the elongation of the base line in the lens supporting means 2, both caused by the heat generated by the CCD chips 25' and 26', are not so well correlated with respect to each other. As a result, an error is caused in the distance measurement.

In the conventional range finder shown in FIG. 4, it is necessary to cover the entire range finder with an additional shield for preventing interfering rays from entering into the optical sensor arrays on the CCD chips 25' and 26' from the side faces of the transparent plates 8.

In view of the foregoing, it is an object of the invention to provide a range finder that obviates the problems described above.

It is another object of the invention to provide a range finder that considers the influences of the heat generated by the current conduction in the CCD chips, and the distance measurement is made accurately under any conditional change with elapse of time based on the temperature correction by using temperature sensors.

It is a further object of the invention to provide a range finder that changes the heat transfer direction from the CCD chips to the CCD supporting means so that complicated longitudinal deformation of the CCD supporting means may not occur.

It is a still further object of the invention to provide a range finder including CCD supporting means having a shielding structure that prevents interfering rays from entering into the side faces of the transparent plates and eliminates an additional shield casing.

Further objects and advantages of the invention will be apparent from the following description of the invention.

SUMMARY OF THE INVENTION

According to one aspect of the present invention, there is provided a range finder including a pair of lenses having optical axes extending parallel to each other, the lenses focusing images of an object on a focal plane, and a pair of CCD chips on the focal plane. Each CCD chip has an optical sensor array corresponding to one of the lenses. The range finder obtains the distance between the range finder and the object from the shift length of the images of the object on the CCD chips based on the principle of triangulation. The range finder further includes supporting means for supporting the lenses and the CCD chips in a predetermined relative positional relationship, and temperature sensors positioned at predetermined locations on the supporting means to correct a shift length based on the temperature difference between the predetermined locations. The supporting means and the lenses are made of a same material.

Advantageously, one of the temperature sensors is positioned between the lenses, and the other of the temperature sensors is positioned between the CCD chips.

According to another aspect of the invention, there is provided a range finder including a pair of lenses having optical axes extending parallel to each other, the lenses focusing images of an object on a focal plane; and a pair of CCD packages, each including a CCD chip on the focal plane and a transparent plate, the CCD chip having an optical sensor array corresponding to one of the lenses, and the transparent plate having a pair of faces parallel to the optical sensor array for transmitting rays from the one of the lenses. The range finder obtains the distance between the range finder and the object from the shift length of the images on the CCD chips based on the principle of triangulation. The range finder further includes supporting means for supporting the CCD packages and the lenses to position the lenses and the CCD chips in a predetermined relative positional relationship; and pairs of bonding ribs. The bonding ribs in each pair are arranged to correspond to one of the CCD packages on the supporting means, along the line perpendicular to the optical axis of the CCD chip and the plane containing the optical axes of the CCD chips. Each of the bonding ribs has a bonding plane parallel to the focal plane. The front faces of the transparent plates facing the corresponding lenses are bonded to the bonding planes of the corresponding bonding ribs to make the optical axes of the lenses coincide with the optical axes of the CCD chips. The transparent plates, the supporting means and the lenses are made of the same material.

Advantageously, the bonding ribs in each pair are spaced apart from each other in a hole formed in the supporting means for the CCD package for transmitting the rays from one of the lenses.

Advantageously, the range finder further includes shield walls, each surrounding the side faces of the transparent plate to prevent the rays, which have not passed through the lenses, from entering into the CCD package.

Advantageously, a plastic material is used as the same material.

The distance measurement error caused by the heat generated by the currents flowing through the CCD chips is reduced by correcting the shift length between the object images based on the difference of the temperatures detected by the temperature sensors positioned at predetermined locations on the supporting means.

By bonding each transparent plate to the supporting means at two locations on the line crossing the transparent plate which is perpendicular to the optical axis of the corresponding CCD chip and the plane including the optical axes of the CCD chips, the influence of the thermal expansion of the transparent plate in the longitudinal direction is reduced and the thermal expansion of the supporting means is caused solely by the thermal conduction from the transparent plates.

The shield walls surrounding all the side faces of the transparent plates prevent the rays, which have not passed through the lenses, from entering into the CCD packages.

DETAILED DESCRIPTION OF PREFERRED EMBODIMENTS

Now, the invention will be explained hereinafter with reference to the accompanying drawings which illustrate the preferred embodiments of the invention.

First embodiment

Figure 1:
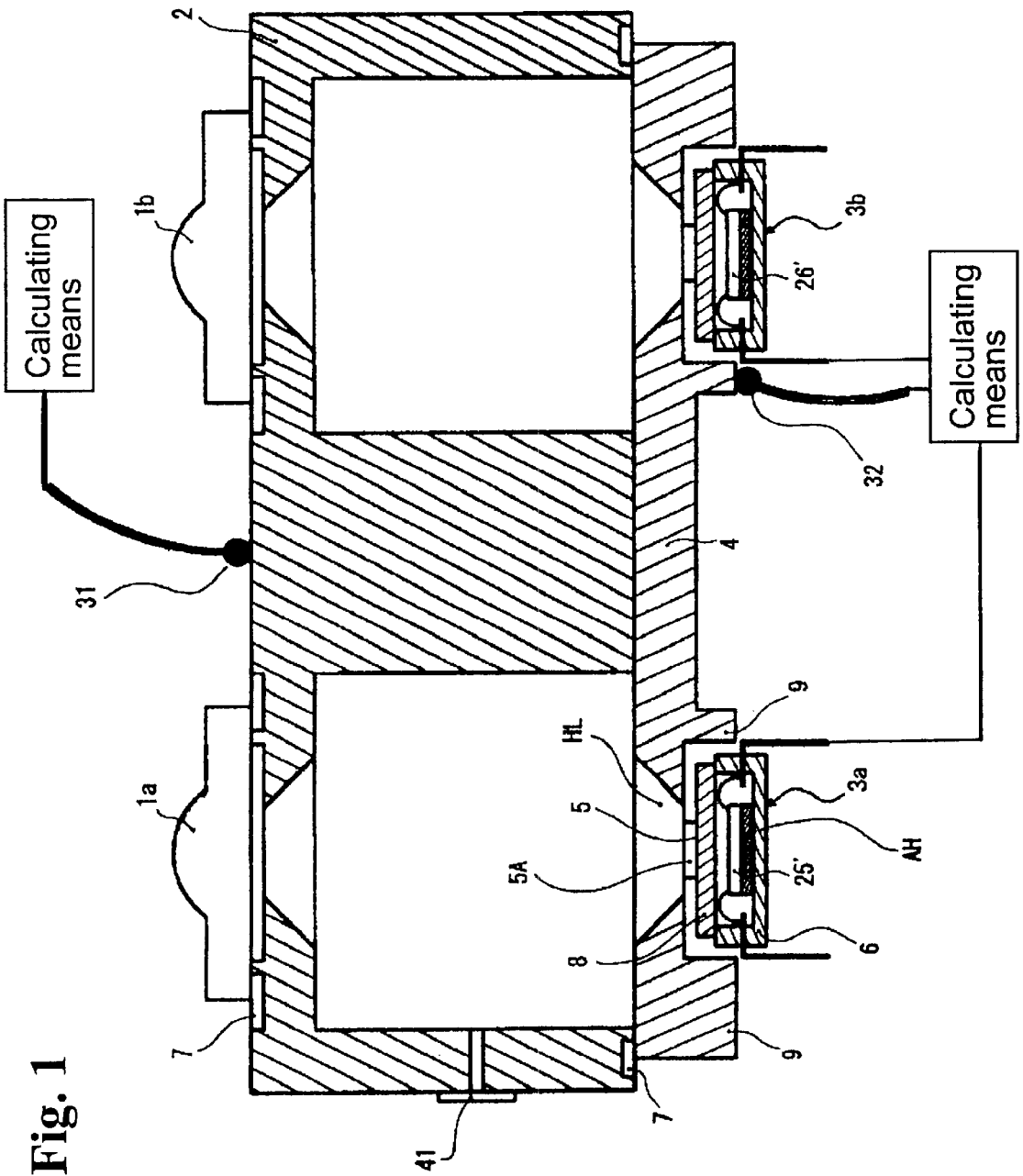
FIG. 1 is a cross sectional view of a range finder according to the invention.
Figure 2A:
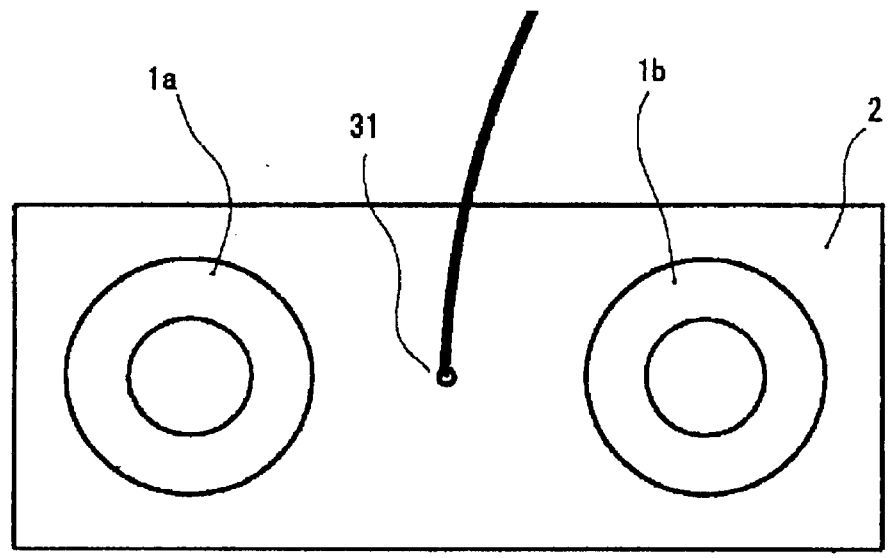
FIG. 2(a) is a top plasticn view of the range finder of FIG. 1.
Figure 2B:
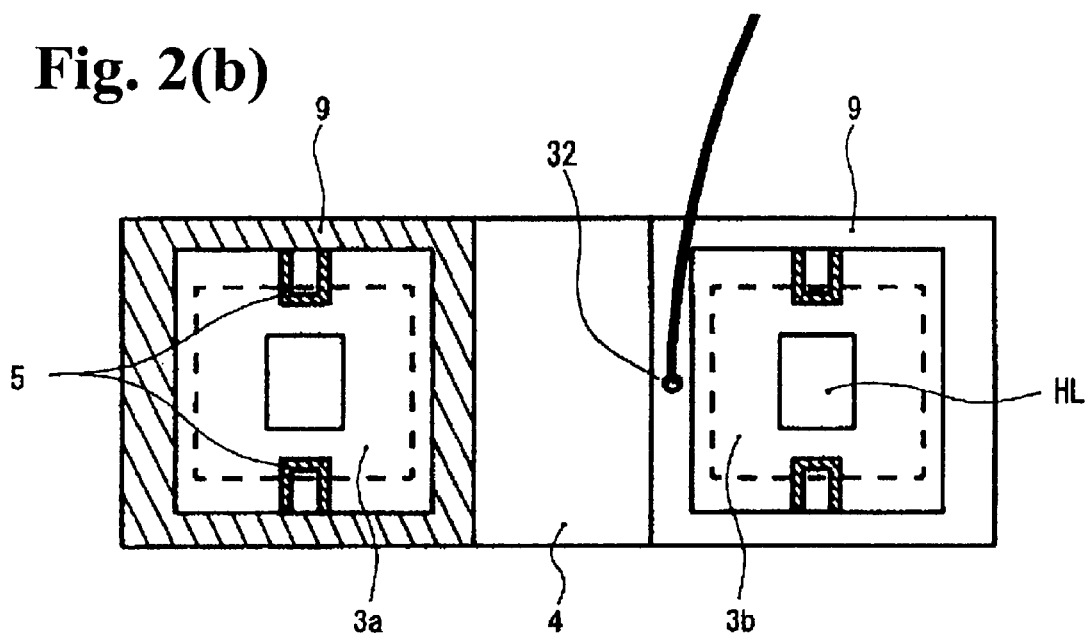
FIG. 2(b) is a partially sectional bottom plasticn view of the range finder of FIG. 1.
Figure 3:
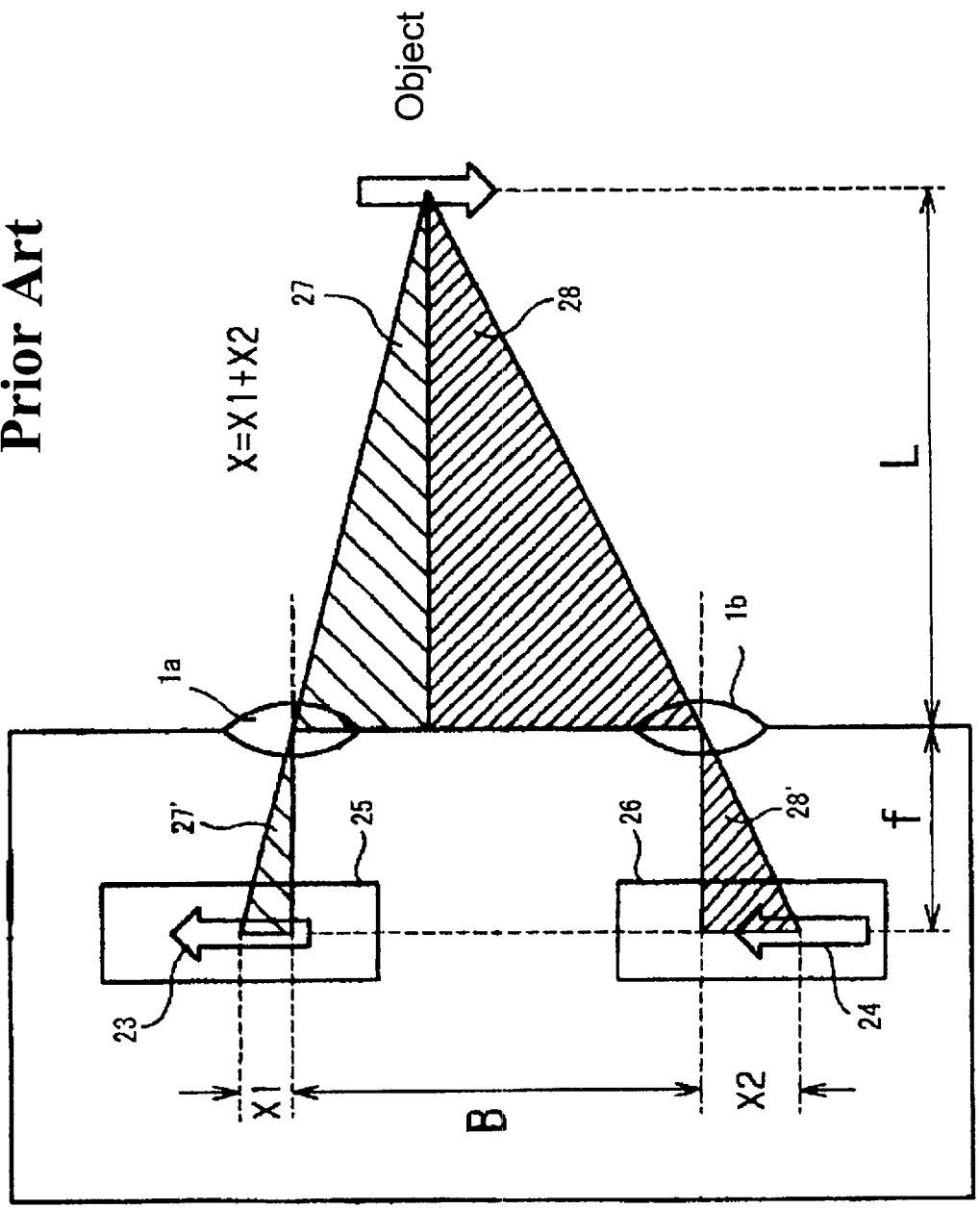
FIG. 3 is a schematic drawing for explaining the principle of triangulation.

FIG. 1 is a cross sectional view of a range finder or a distance measuring apparatus according to the invention. FIG. 2(a) is a top plasticn view of the range finder of FIG. 1. FIG. 2(b) is a partially cut bottom plasticn view of the range finder of FIG. 1, wherein the CCD packages are described by the broken lines.

Referring now to FIG. 1, a temperature sensor 31 is disposed on lens supporting means 2 between lenses 1a and 1b, and another temperature sensor 32 is located under CCD supporting means 4 in the vicinity of a CCD package 3a or 3b.

Figure 4:
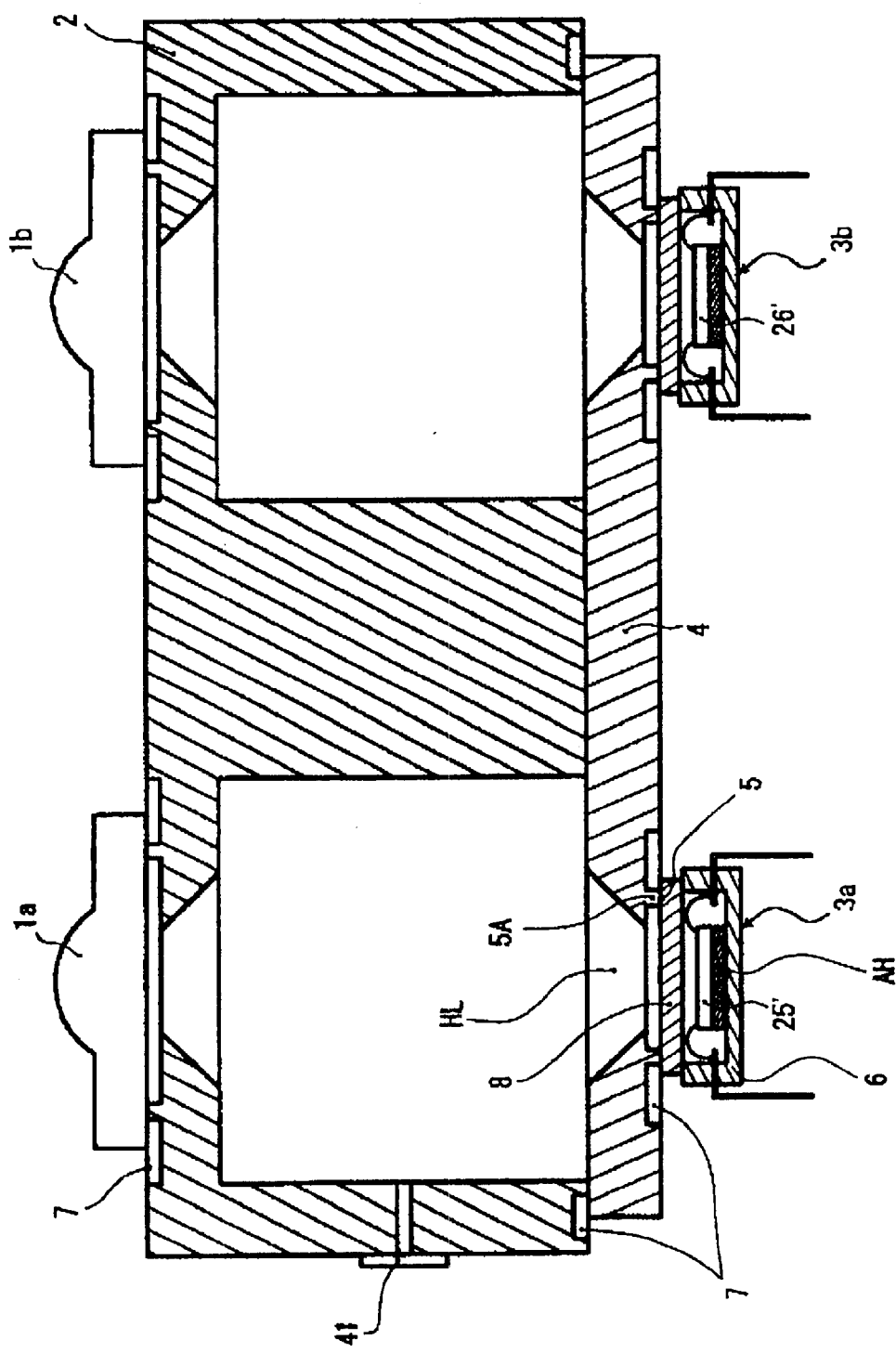
FIG. 4 is a cross sectional view of a conventional range finder constructed on the basis of the principle described with reference to FIG. 3.
Figure 5A:
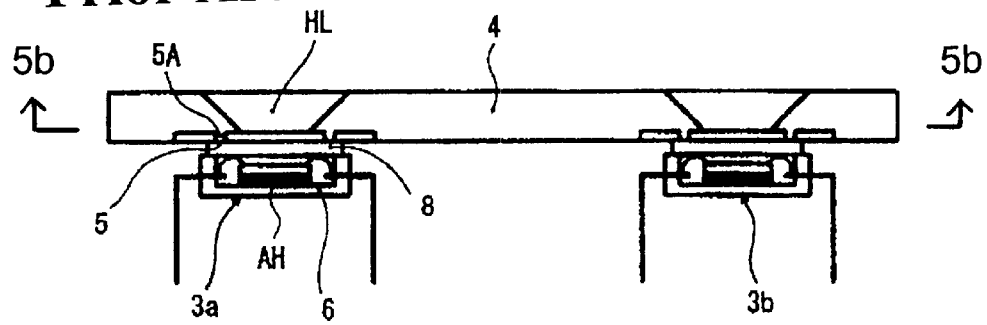
FIG. 5(a) is an explanatory vertical sectional view of bonding portions between CCD supporting means and CCD packages according to the prior art.
Figure 5B:
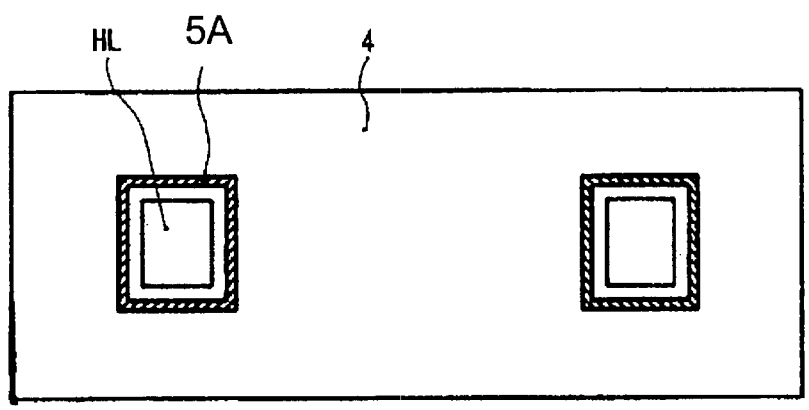
FIG. 5(b) is a cross sectional view of the bonding portions taken along line 5b—5b of FIG. 5(a)
Figure 6:
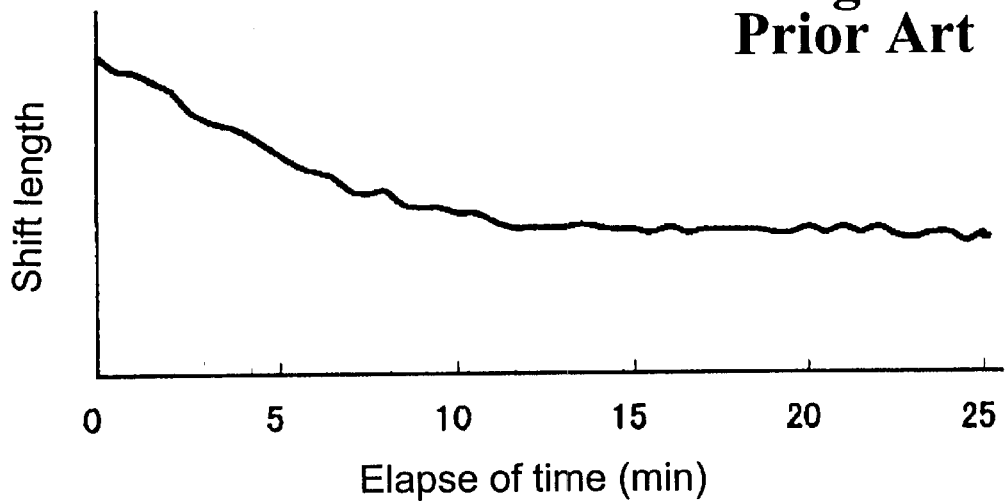
FIG. 6 is a graph relating a shift length of the optical axes with elapse of time after a current conduction through CCD chips.

In FIG. 1, the CCD packages 3a and 3b are fixed to the CCD supporting means 4 through transparent plates 8 bonded to respective bonding planes 5 of bonding ribs 5A formed under the bottom surface of the CCD supporting means 4 in the same manner as in FIG. 4. However, the structure at the bottom surface of the CCD supporting means 4 in FIG. 1 is different from that in FIG. 4 as described later.

The specific structure at the bottom surface of the CCD supporting means 4 in FIG. 1 facilitates reduction of the influences of the thermal expansions of the transparent plates 8 in the current conduction through the CCD packages 3a, 3b to thereby reduce the complicated thermal deformation of the CCD supporting means 4 that impairs the accuracy of distance measurement. Also, it prevents interfering rays from entering into optical sensor arrays of the CCD chips 25', 26' through the side faces of the transparent plates 8.

The lenses 1a and 1b are fixed on the lens supporting means (hereinafter referred to as the "frame") 2 and spaced apart from each other for a base line length. The CCD packages 3a and 3b are fixed onto the CCD supporting means (hereinafter referred to as the "plate") 4 and spaced apart from each other for the base line length. The optical axes of the lenses 1a, 1b and the CCD packages 3a, 3b are adjusted, and then, the frame 2 and the plate 4 are fixed together by injecting an adhesive through adhesive injection bores 7.

Since all the constituent elements except for the CCD chips 25' and 26' are made of the same plastic material (cycloolefin polymer), the constituent elements may be bonded to each other with an organic solvent, such as toluene, without using any adhesive.

As described earlier, the heat generated in the CCD chips 25', 26' affects the thermal expansions of the frame 2 and the plate 4, and the thermal expansion difference between the frame 2 and the plate 4 affects the positional relationships of the optical axes, resulting in a distance measurement error.

However, it is impossible to prevent the frame and the plate from expanding thermally due to their structures. Therefore, it is desirable to quantitatively obtain the relation of the shift length with respect to the difference of the thermal expansion between the frame 2 and the plate 4 and to correct the shift length based on the thermal expansion difference.

To evaluate the thermal expansions of the frame 2 and the plate 4, the temperature sensors 31 and 32 are attached to the locations as shown in FIG. 1, which represent the movements of the frame 2 and the plate 4 caused by their thermal expansions. The temperature difference between the frame 2 and the plate 4 is obtained from the outputs of the temperature sensors 31 and 32.

Figure 7:
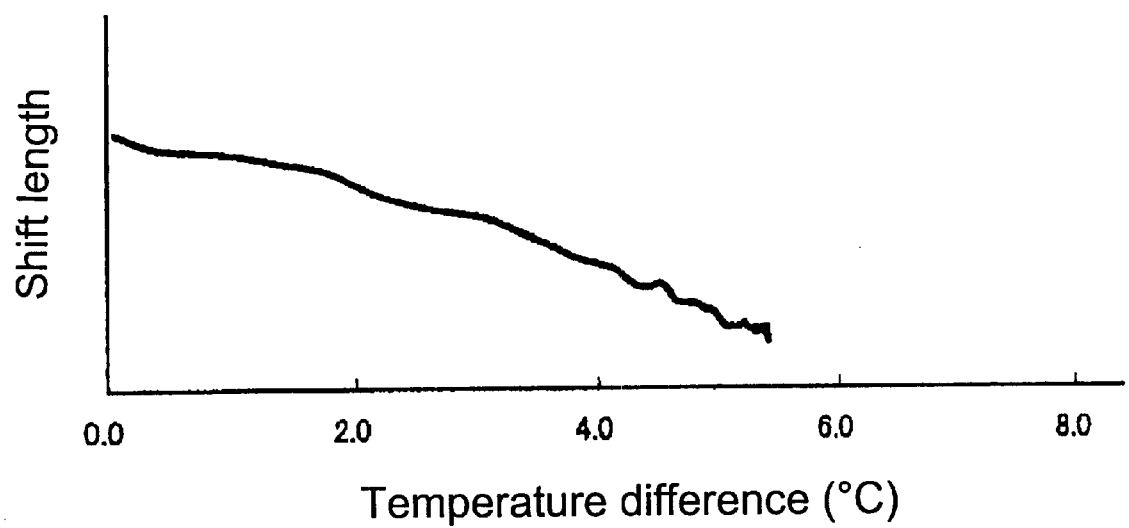
FIG. 7 is a graph relating to a temperature difference of two temperature sensors and the shift length.
Figure 8A:
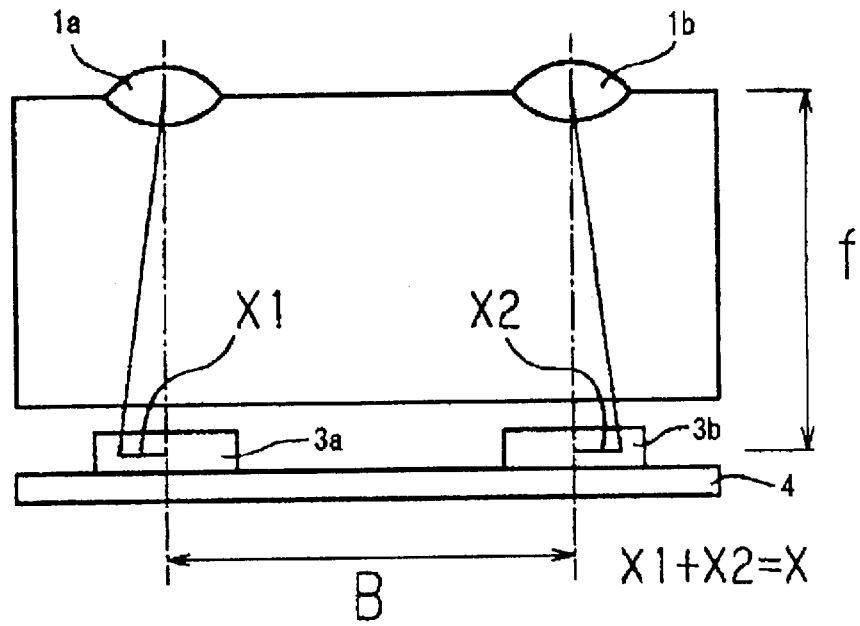
FIG. 8(a) is a cross sectional view of an entire range finder module at a certain temperature.
Figure 8B:
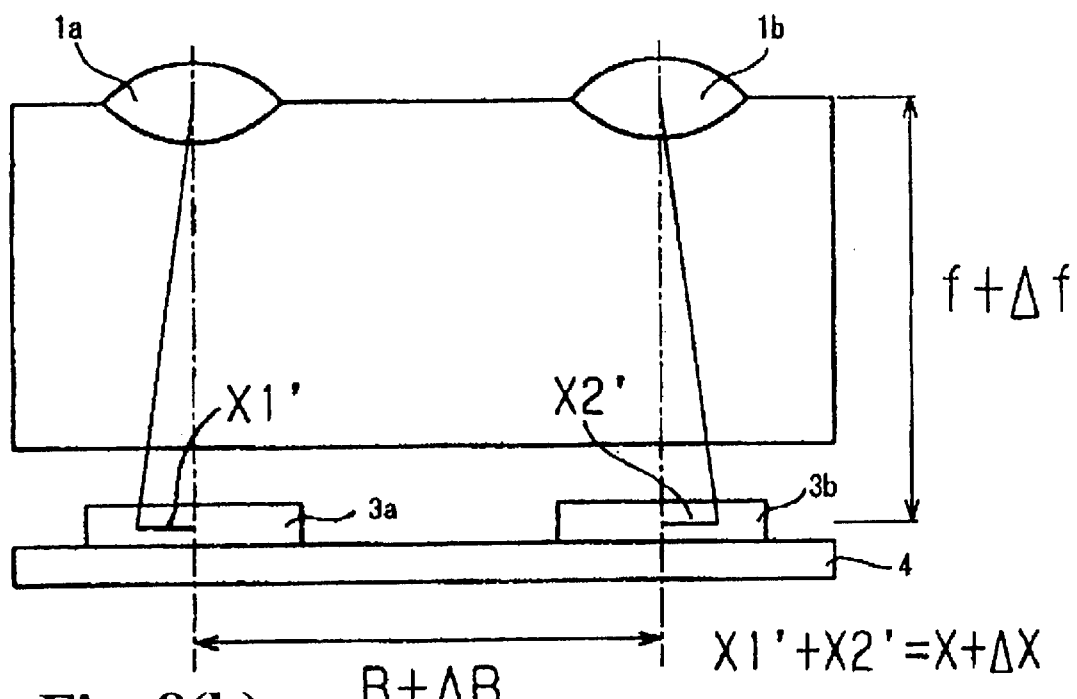
FIG. 8(b) is another cross sectional view of the range finder module expanded thermally while maintaining the relative positional relations of the constituent elements in the range finder module.
Figure 9:
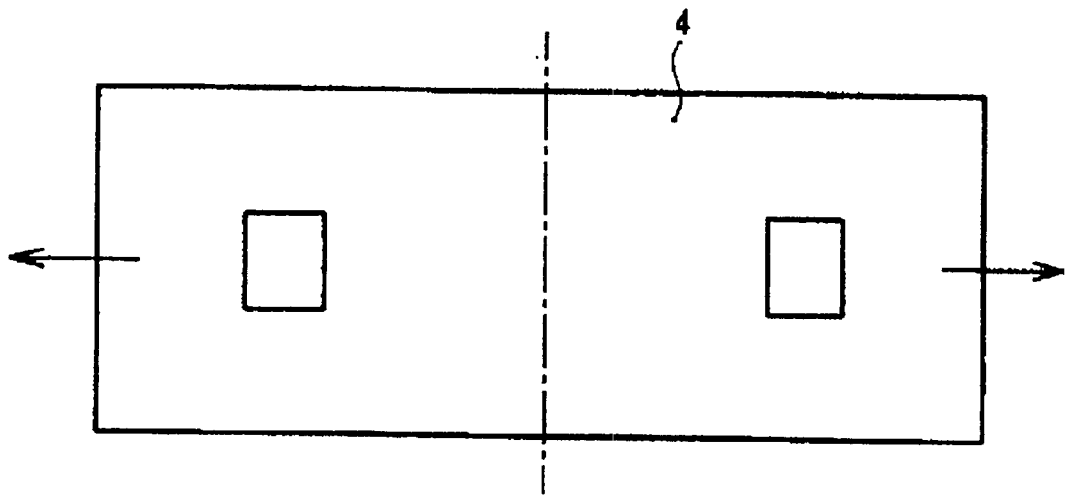
FIG. 9 is a top plasticn view of the CCD supporting means schematically showing the ideal thermal deformation.
Figure 10:
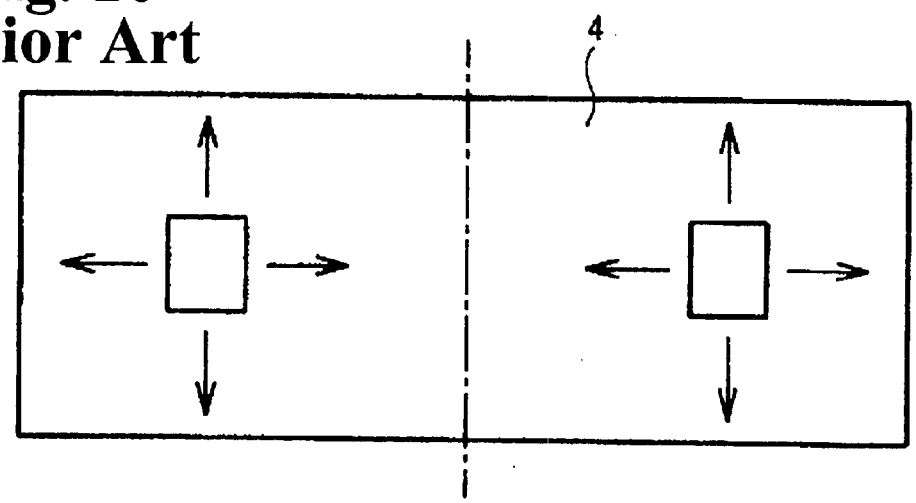
FIG. 10 is a top plasticn view of the CCD supporting means schematically showing the thermal deformation thereof in the conventional range finder.

The relation between the temperature difference and the shift length can be quantitatively described, as shown in a graph in FIG. 7. In the figure, the horizontal axis represents the temperature difference between the frame 2 and the plate 4, that is equal to (the temperature of the plate 4)–(the temperature of the frame 2), and the vertical axis represents the shift length. The shift length may be corrected with respect to every temperature difference between the frame 2 and the plate 4 by using almost the linear correlation described in FIG. 7.

Even when the heat generation in the CCD chips changes the shift length, the changed shift length may be corrected in calculation means, and the distance measurement error may be reduced by using the measured temperature difference between the frame 2 and the plate 4.

In the range finder according to the first embodiment, the frame 2 and the plate 4 may be made of the same material or different materials.

Second embodiment

As shown in FIGS. 1 and 2(b), two pairs of bonding ribs 5A are formed on the bottom surface of the plate 4. Each pair of bonding ribs 5A is located on a line perpendicular to the optical axis of the lens 1a or 1b and a plane containing the optical axes of the lenses 1a and 1b. The bonding ribs 5A face each other across an image ray hole HL, through which the image ray from the lens 1a or 1b passes.

The CCD packages 3a and 3b are fixed to the plate 4 by means of transparent plates 8, each bonded to the bonding planes 5, or lower end faces, of the bonding ribs 5A.

As shown in FIGS. 1 and 2(b), the entire peripheral portion of the rectangular transparent plate 8 is not bonded to the plate 4 according to the second embodiment. The transparent plate 8 is bonded to the plate 4 at bonding positions on two opposite sides of the image ray hole HL. The bonding positions are located on the line perpendicular to the optical axis of the CCD chip 25' or 26' and the plane containing the optical axes of the CCD chips 25' and 26'.

By virtue of this configuration, the heat generated in the CCD chips 25' and 26' is transferred, at first, to the transparent plates 8 fixed to the respective CCD packages 3a and 3b, and then to the plate 4 via the bonding planes 5. Here, this two-point bonding is effective as described below.

Since the opposite side faces of the rectangular transparent plate 8 perpendicular to the base line of the optical systems are not bonded to the plate 4, the thermal expansion of the transparent plate 8 in the longitudinal direction of the plate 4 is not restricted by the plate 4. Thus, the longitudinal thermal expansion of the transparent plate 8 does not affect the plate 4.

When the heat is transferred from the bonding planes 5 to the plate 4, it can be considered that the plate 4 thermally expands uniformly in the longitudinal direction thereof. By employing the configuration according to the second embodiment, the correction according to the first embodiment that uses temperature sensors becomes more effective to reduce the distance measurement error caused by the heat generated in the CCD chips 25' and 26'.

Third embodiment

As shown in FIGS. 1 and 2(b), shield walls 9 surrounding the side faces of the respective transparent plates 8 in the CCD packages 3a and 3b are formed on the bottom surface of the plate 4 for preventing interfering rays from entering into the optical sensor arrays of the CCD chips 25' and 26' from the side faces of the transparent plates 8.

In FIG. 2(b), the horizontal cross section of the shield wall 9, that surrounds the CCD package 3a, is shown.

By forming the shield walls 9 on the bottom surface of the plate 4, it is not necessary to employ the conventional shield casing that covers the entire range finder.

According to the invention, the range finder module is made of a plastic material, the temperature sensors 31 and 32 are attached to the frame 2 and the plate 4, respectively, and the shift length of the object images is corrected based on the temperature difference detected by the temperature sensors 31 and 32. Thus, it is possible to reduce the distance measurement error caused by the deviation of the base line length due to the thermal expansion difference between the plate and the frame in the current conduction state of the CCD chips. The invention can fully utilize the merit that all the structural components are made of the same material and are deformed thermally in the same manner by the environmental temperature change. Therefore, the range finder or distance measuring apparatus can exhibit a higher accuracy in distance measurement.

Also, according to the invention, the transparent plate 8 of the CCD package 3a or 3b is bonded to the plate 4 at two locations on the front face thereof. The bonding locations are placed on the line extending perpendicular to the optical axis of the CCD chip and the plane containing the optical axes of the CCD chips. By bonding the transparent plates 8 to the plate 4 as described above, the thermal expansions of the transparent plates 8 do not affect significantly to the longitudinal deformation of the plate 4, and the thermal deformation of the plate 4 in the longitudinal direction due to the thermal expansion of the transparent plates 8 is comparatively uniform. Therefore, the correction using the temperature sensors in the first aspect of the invention can be more effectively applied if the subjects of the first and second aspects are combined, resulting in obtaining a higher distance measurement accuracy.

According to the invention, further, the peripheral portions of the transparent plates 8 are surrounded by the respective shield walls which prevent interfering rays from entering into the CCD chips from the side faces of the transparent plates. Thus, it is unnecessary to cover the range finder by a shield casing as in the conventional range finder, and in designing the CCD packages, general transparent plates may be employed on the front faces of the CCD packages without considering the influences of the interfering rays.

While the invention has been explained with reference to the specific embodiments of the invention, the explanation is illustrative and the invention is limited only by the appended claims.

What is claimed is:

1. A range finder comprising:

a pair of lenses having optical axes parallel to each other, said lenses focusing images of an object on a focal plane;

a pair of CCD chips located on the focal plane and having optical sensor arrays to correspond to the respective lenses so that a distance from the range finder to the object is obtained based on a shift length of the images of the object on the CCD chips according to a principle of triangulation;

supporting means for supporting the lenses and the CCD chips in a predetermined relative positional relationship, said supporting means being made of a material same as that of the lenses; and temperature sensors positioned at predetermined locations on the supporting means to measure temperatures at the locations to thereby correct the shift length based on a difference of the temperatures between the predetermined locations.

2. The range finder according to claim 1, wherein one of said temperature sensors is positioned between the lenses, and the other one of the temperature sensors is positioned between the CCD chips.

3. A range finder comprising:

a pair of lenses having optical axes parallel to each other, said lenses focusing images of an object on a focal plane;

a pair of CCD packages, each CCD package including a CCD chip located on the focal plane and having an optical sensor array corresponding to each lens, and a transparent plate having a pair of faces parallel to the optical sensor array for transmitting ray from the one of the lenses and fixed to the CCD chip so that a distance from the range finder to the object is obtained from a shift length of the images of the object on the CCD chips based on a principle of triangulation;

supporting means connected to the lenses and CCD packages for supporting the CCD packages and the lenses to thereby position the lenses and the CCD chips in a predetermined relative positional relationship; and bonding ribs formed on the supporting means and having bonding planes parallel to the focal planes of the lenses, at least one bonding rib being arranged on the supporting means to correspond to one of the CCD packages and situated on a line perpendicular to an optical axis of the CCD chip and a plane containing optical axes of the CCD chips, one face of the transparent plate facing the lens being bonded to the bonding plane of the at least one bonding rib so that the optical axis of the lens coincides with the optical axis of the CCD chip, said transparent plates, supporting means and lenses being made of a same material.

4. The range finder according to claim 3, wherein said bonding ribs are formed of two pairs of the bonding ribs, said bonding ribs in one pair being spaced apart from each other and situated in a hole formed in the supporting means corresponding to each of the CCD packages for transmitting the rays from one of the lenses.

5. The range finder according to claim 3, wherein said supporting means further includes shield walls, each shield wall surrounding side faces of each transparent plate to prevent the rays which have not passed through the lenses from entering into the CCD package.

6. The range finder according to claim 3, further comprising temperature sensors positioned at predetermined locations on said supporting means to correct the shift length based on the temperature difference between the predetermined locations.

7. The range finder according to claim 6, wherein one of said temperature sensors is positioned between the lenses, and the other one of the temperature sensors is positioned between the CCD chips.

8. The range finder according to claim 6, further comprising calculating means connected to the CCD chips and the temperature sensors to measure and correct the shift length, said calculating means calculating the distance.

* * * * *

UNITED STATES PATENT AND TRADEMARK OFFICE
CERTIFICATE OF CORRECTION

PATENT NO. : 6,337,736 B1
DATED : January 8, 2002
INVENTOR(S) : Osamu Sugiyama, Akio Izumi, Nobuo Hirata and Hajime Fukamura It is certified that error appears in the above-identified patent and that said Letters Patent is hereby corrected as shown below:

Column 1,
Line 31, change "b" to -- 1b --;
Line 65, change "plastictes" to -- plates --;

Column 3,
Line 7, after "respect", add -- to --;
Line 39, change "C." to -- C --;
Line 57, change "plasticn" to -- plan --;

Column 5,
Line 56, change "plasticn" to -- plan --;
Line 58, change "plasticn" to -- plan --;

Column 6,
Line 3, after "relating" add -- to --;
Line 14, change "plasticn" to -- plan --;
Line 16, change "plasticn" to -- plan --;
Line 29, change "plasticn" to -- plan --; and
Line 30, change "plasticn" to -- plan --.

Signed and Sealed this

Twenty-third Day of April, 2002

*Attest:*

*Attesting Officer*

JAMES E. ROGAN
*Director of the United States Patent and Trademark Office*